United States Patent [19]

Schibrowski

[11] 4,041,590
[45] Aug. 16, 1977

[54] BROACHING DEVICE

[75] Inventor: Jürgen Schibrowski, Lohmar, Germany

[73] Assignee: Jean Walterscheid GmbH, Lohmar, Germany

[21] Appl. No.: 726,059

[22] Filed: Sept. 23, 1976

[30] Foreign Application Priority Data

Sept. 23, 1975 Germany .............................. 2542346

[51] Int. Cl.[2] ............................................ B23P 15/42
[52] U.S. Cl. ................................................ 29/95.1
[58] Field of Search ....................................... 29/95.1

[56] References Cited

U.S. PATENT DOCUMENTS

| 1,448,170 | 3/1923 | Utzinger | 29/95.1 |
| 1,744,217 | 1/1930 | Forberg | 29/95.1 |
| 2,827,687 | 3/1958 | Avery | 29/95.1 |
| 3,317,984 | 5/1967 | Jacobson | 29/95.1 |

Primary Examiner—Leonidas Vlachos
Attorney, Agent, or Firm—Edmund M. Jaskiewicz

[57] ABSTRACT

A broaching device has an elongated body having a cross section to define at least two opposed faces upon which are secured toothed cutting elements by screw elements extending from the respective opposite faces of the body to the cutting elements. The body is provided with recesses and openings to provide access to the screw elements on opposite faces of the body.

7 Claims, 8 Drawing Figures

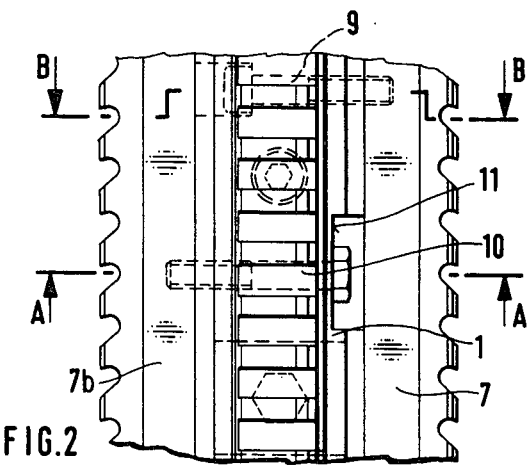
FIG.2
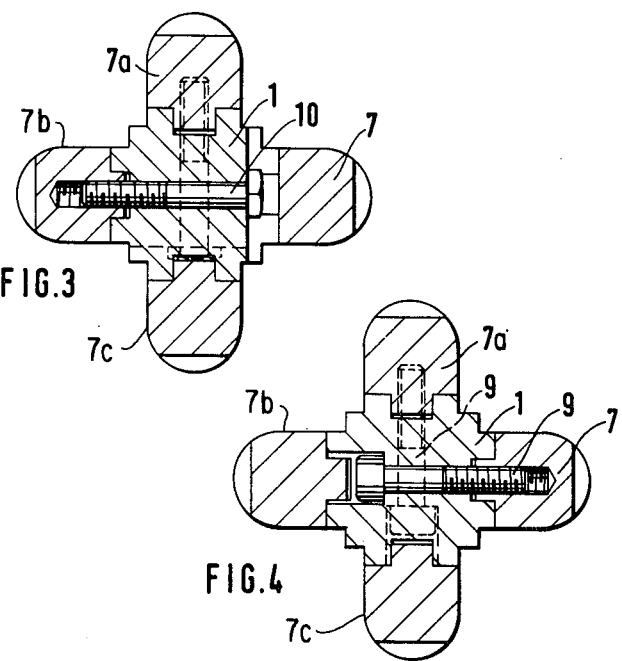
FIG.3
FIG.4

BROACHING DEVICE

The present invention relates to a broaching device, more particularly, to a broaching device for forming grooves and having detachable toothed cutting elements.

Broaching tools are generally made in one piece and require grinding when the blades or cutting edges are worn. Worn cutting edges not only cause a deterioration with respect to the quality of the broached surface but also may require an increase in the force necessary to pull the tool through the workpiece which may bring about a reduction of the useful tool life. A blunt or worn broaching tool will cause an elastic expansion of the workpiece such that the broached profile may be too small at the end of the broaching operation. The useful operating life of the broaching tool is also determined by its dimensional accuracy. Wear-marks on the free faces of the teeth of the cutting elements, grooving or scoring in the toothed cutting element and undue rounding of the cutting edges also indicate the end of useful tool life. It is conventional practice to regrind such a tool in order to restore the profile of the tool to its original shape. However, eventually the cutting edges of the broaching tool will be less than the original intended dimensions and regrinding of the tool will no longer be possible. At this stage, the entire tool must be scrapped and replaced by a new one.

It is therefore the principal object of the present invention to provide an improved broaching tool having a significantly increased tool life.

It is another object of the present invention to provide such a broaching tool having cutting elements which can be economically and repeatedly reground so as to avoid replacing the entire tool.

According to one aspect of the present invention a broaching device may comprise an elongated body having on one end thereof a stock portion engagable with a stock holder, a centering portion and a tail piece on the other end thereof. The body has a polygonal cross section with an even number of faces and a plurality of toothed cutting elements are rigidly and detachably secured on the faces. The cutting elements are secured by a plurality of screw elements extending from respective opposite faces of the body. The body is provided with recesses or openings therein so as to provide access to the screw elements on the opposite faces of the body.

The broaching device of the present invention is advantageous in that the useful tool or operating life of the body of the tool is virtually unlimited. The useful life of the cutting elements is also significantly increased because any cutting elements which may fall short of the final desired dimensional result can be placed at the forward end of the tool. It is to be noted that broaching tools of the type to which the present invention relates are commonly of a tapered shape such that the cutting elements at the rearward end of the body with respect to the direction of cutting movement of the tool are larger than the cutting elements at the forward end of the body. The rear cutting elements will form the broached opening in the work piece to its final required dimensions. The result is a very substantial overall increase in the working life of the tool as a whole.

A further advantage of the present invention is that there is no necessity for omitting any teeth of the cutting elements in order to accommodate the heads of screws used to secure the cutting elements to the tool body. Thus, the successive teeth on the cutting elements produce equal and uniform cuts on the workpiece which lead to an even and steady advance of the tool during a broaching operation. As a result, there is a reduced danger of fracture of the cutting teeth.

Other objects and advantages of the present invention will be apparent upon reference to the accompanying description when taken in conjunction with the following drawings, which are exemplary, wherein;

FIG. 2 is a partial elevational view of a broaching tool according to the present invention having cutting elements on four faces thereof;

FIG. 3 is a sectional view taken along the line A—A through FIG. 2;

FIG. 4 is a sectional view taken along the line B—B in FIG. 2;

Proceeding next to the drawings where in like reference symbols indicate the same parts throughout the various views a specific embodiment and modifications of the present invention will be described in detail.

Figure 1:
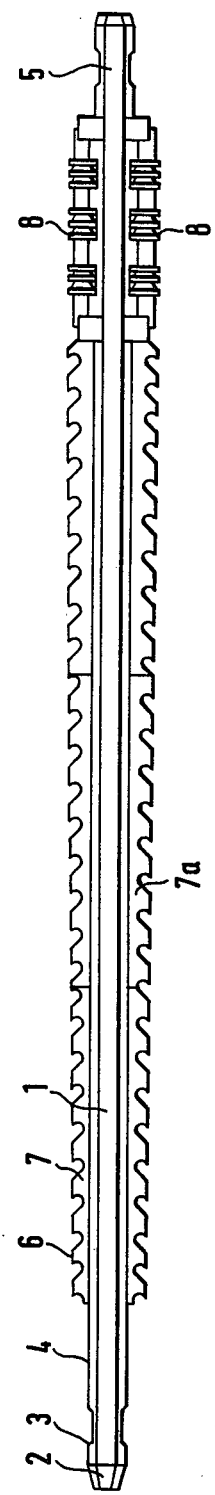
FIG. 1 is an elevational view of a broaching tool according to the present invention having cutting elements provided on opposite faces of the tool body.
Figure 7:
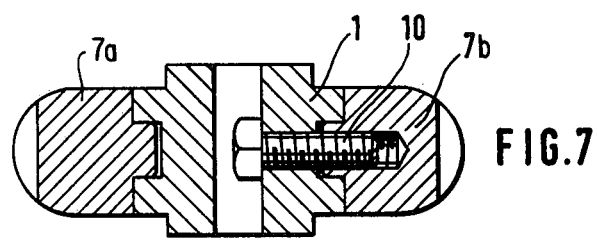
FIG. 7 is a sectional view taken along line D—D of FIG. 5.

As may be seen in FIG. 1, the broaching tool according to the present invention comprises a basic tool body 1 having a shank or stock portion 2 at the forward end thereof and engagement faces 3 on the stock portion for tension engagement in a chuck or other holder device for pulling the broaching tool through a workpiece. Following the shank portion 2, is a centering portion or surface 4 for concentric alignment of the broaching tool with respect to the work piece. The rear end of the body 1 is provided with a tail piece 5 for effecting longitudinal movement of the tool toward and away from the workpiece.

The middle portion of the tool is provided with an even number of faces upon which are rigidly but detachably secured cutting elements 7 and 7' having cutting edges or teeth 6 and which taper toward the forward end of the tool. The forward or leading portions of the cutting elements accomplish the initial roughing of the broaching operation and the teeth at the rear portions of the cutting elements form the workpiece opening to a size approaching its final required dimensions. Smoothing or fine finishing blades 8 are provided at the rearward end of the tool 1 to complete the broaching process.

Proceeding next to FIGS. 2-4, the tool body 1 has a substantially rectangular cross section to form four faces upon which cutting elements 7, 7a, 7b and 7c are detachably secured according to the present invention. The cutting element 7 on one face of the tool body 1 is secured by socket headed screws 9 inserted in recess openings formed in a face of the body opposite from the cutting element 7. The cutting element 7a is secured in the same manner as cutting element 7 by a plurality of socket headed screws 9 driven from the opposite face of the body.

Cutting element 7b opposed from cutting element 7 is secured by hexagon headed screws 10 assembled from the opposite face of the tool body 1 and whose heads are accessibly received in recesses 11 formed partially in the face of the cutting element 7 and partially in a face of the body 1. It is apparent that the screws 10 are inserted into the body 1 prior to mounting of the cutting elements 7 and 7a thereon.

The cutting element 7c is detachably secured in the same manner as adjacent cutting element 7b by a plurality of socket headed screws 10.

By positioning the screws 9 and 10 in this manner all of the cutting elements are secured by screws which are inserted or driven from the opposite sides of the tool body 1. The cutting edges or teeth 6 of the cutting elements are thus not interrupted by the necessity of providing holes or recesses for the heads of the screws.

Figures 5, 8:
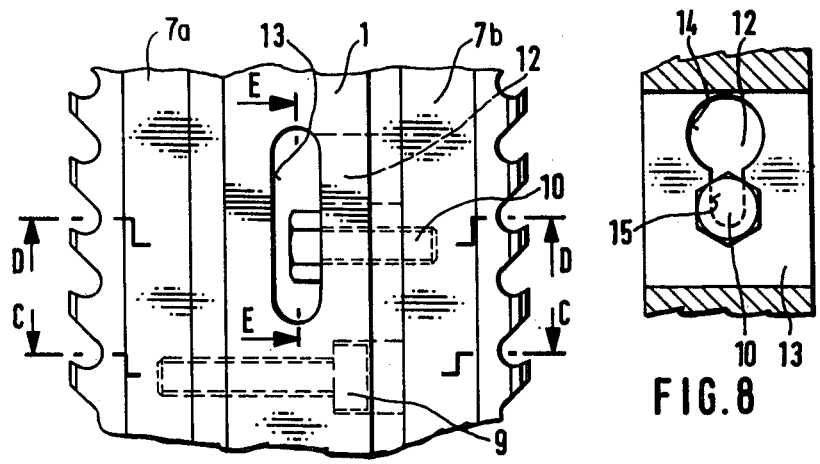
FIG. 5 is a partial view of the broaching tool in FIG. 1 but in enlarged scale to illustrate the fastener screws for the cutting elements.
FIG. 8 is a sectional view taken along the line E—E of FIG. 5.
Figure 6:
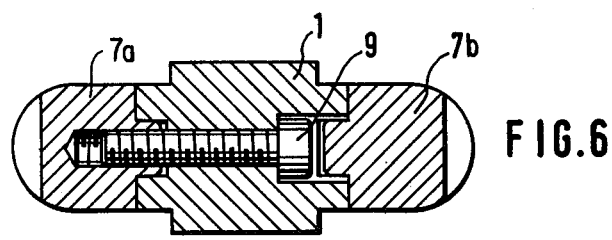
FIG. 6 is a sectional view taken along the line C—C of FIG. 5.

In FIGS. 5–8 there is illustrated a broaching tool according to the present invention wherein only two cutting blade elements are provided on opposed faces of the tool body 1. These cutting elements 7a and 7b are assembled in the same manner as described above wherein cutting element 7a is secured by socket headed screws 9 and cutting element 7b secured by hexagonal headed screws 10. In accordance with the present invention, in order to accommodate the head of the screw 10 a slotted opening 13 is provided in the body 1 and extending from the slot 13 to the face on the body 1 on which the cutting element 7b is mounted is a passage 12 having a key-hole configuration substantially as shown in FIG. 8. The passage 12 is provided with an opening 14 of sufficiently large size to enable the head of the screw 10 to pass there through. The lower portion of the opening 12 has a slotted portion 15 which is smaller in size than the head of the screw 10 so as to define abutment surfaces for the screw head. Thus, in assembly of the screw 10, its head is inserted into the opening 14 and then the screw is moved downwardly into the slotted portion 15 into the position as shown in FIGS. 5 and 8.

The slotted opening 13 extends at right angles with respect to the axis of the screw 10 and communicating with the opening 13 is the screw passage 12 having the configuration of a key-hole as described above.

Thus it can be seen that the present invention discloses a broaching tool wherein the cutting elements are rigidly but detachably secured to faces of the tool body by screw elements driven from the relative opposite faces of the screw body. The body is provided either with openings or recesses to accommodate the heads of the screw elements. Accordingly, the toothed cutting elements can be detachably secured to the body without disrupting the uniformity of the cutting teeth by providing openings or recesses to receive the heads of the screw elements.

It will be understood that this invention is susceptible to modification in order to adapt it to different usages and conditions, and accordingly, it is desired to comprehend such modifications within this invention as may fall within the scope of appended claims.

What is claimed is:

1. A broaching device comprising an elongated body having on one end thereof a stock portion engagable with a stock holder, a cutting portion and a tail piece on the other end thereof, said body portion having a polygonal cross section with an even number of faces, a plurality of toothed cutting elements having threaded apertures in a mounting face and being rigidly and detachably secure on respective opposite ones of a corresponding plurality of said body faces, a plurality of screw elements extending through said body portion in the direction of said opposite faces of said body to engage said apertures and secure said cutting elements thereon, said body having one of recesses and openings therein to provide access to said screw elements, said cutting elements having corresponding recesses.

2. A broaching device as claimed in claim 1 wherein said body has a substantially rectangular cross section.

3. A broaching device as claimed in claim 1 wherein said plurality of cutting elements comprises two cutting elements.

4. A broaching device as claimed in claim 3 wherein one of said cutting elements is secured by first screw elements extending from the face opposite said one cutting element, there being second screw elements each having a head and securing the other of said cutting elements to said opposite face of the body, and means in said body for accessibly receiving said heads of said second screw elements.

5. A broaching device as claimed in claim 4 wherein said head receiving means comprises an opening in said body having a screw element passage communicating therewith and opening on said opposite face.

6. A broaching device as claimed in claim 4 and there being recess means in said body opposite face for receiving heads of said first screw elements securing said one cutting element.

7. A broaching device as claimed in claim 5 wherein said screw elements each has a polygonal head, said body opening comprising a slot and said passage having a key-hole cross section with a portion thereof sufficient to enable a screw element head to pass therethrough and a further portion smaller than said head to define an abutment surface for the screw element head.

* * * * *